M. EASTHAM.
VARIABLE INDUCTANCE WINDING.
APPLICATION FILED MAR. 27, 1908.

916,541.

Patented Mar. 30, 1909.

UNITED STATES PATENT OFFICE.

MELVILLE EASTHAM, OF BOSTON, MASSACHUSETTS, ASSIGNOR TO CLAPP-EASTHAM COMPANY, OF BOSTON, MASSACHUSETTS, A CORPORATION OF MASSACHUSETTS.

VARIABLE-INDUCTANCE WINDING.

No. 916,541.   Specification of Letters Patent.   Patented March 30, 1909.

Application filed March 27, 1908. Serial No. 423,549.

*To all whom it may concern:*

Be it known that I, MELVILLE EASTHAM, a citizen of the United States, residing at Boston, in the county of Suffolk and State of Massachusetts, have invented an Improvement in Variable-Inductance Windings, of which the following description, in connection with the accompanying drawings, is a specification, like numerals on the drawings representing like parts.

My invention, while of general applicability to many uses, is of particular value in wireless telegraphy work, as for example for both the primary and secondary of receiving transformers and variable inductances for the same purpose.

As the common form of variable inductance winding consists of a coil having a continuous winding from end to end and a sliding terminal or electrode arranged to slide lengthwise of the coil transversely of the turns of winding so as to move or jump from one coil or turn to the next, thereby cutting in or out an additional turn at each movement, and one of the most serious objections to this form of winding is that when the contacting electrode bridges from one turn to the next it thereby short-circuits the included turn of winding or if it jumps from one turn to the next without bridging the gap then there is an instant when the entire circuit is broken, and in either case the coil is rendered correspondingly inefficient and undesirable.

My invention aims to remedy the above objections besides introducing various further advantages and improvements. To this end I wind the coil with a plurality of wires, instead of a single wire, said plurality of wires being preferably of different lengths connected into one side of the circuit at the end of the coil and thence wound side by side in parallel, whereby, when the movable contact slides from one turn to the next it cannot produce any short-circuit because it simply bridges from a turn of one wire to the corresponding turn of the other wire, and yet meanwhile maintains the circuit unbroken. When the wires are of unequal length there is a more gradual change of inductance in the coil than when the windings of the latter are formed from one wire only.

Further advantages of my invention will appear more at length in the course of the following description, reference being made to the accompanying drawings, in which I have graphically illustrated my invention.

Figure 1:
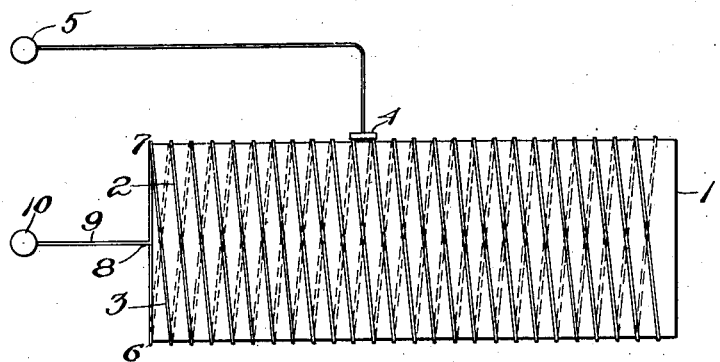
Figure 2:
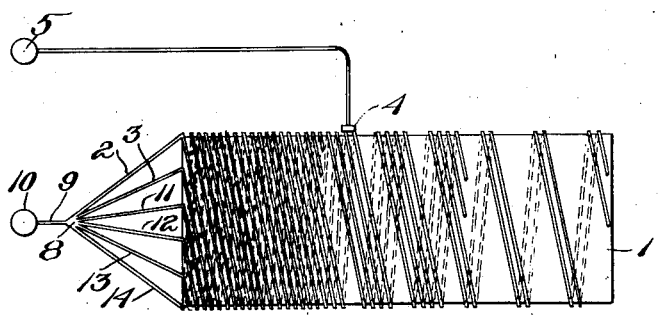

In the drawings, Figure 1 is a view partly in side elevation, containing sufficient details to make my invention understood; Fig. 2 is a diagrammatic representation of a preferred form of the winding.

The particular form of coil or inductance winding does not constitute any part of my invention and therefore it will be understood that I intend my invention to be applied to any and all kinds of windings, the cylindrical winding of the drawings being shown merely for convenience of presenting and disclosing the invention clearly.

On any suitable support or core 1 I wind the wires in usual manner side by side, insulated from each other in any convenient or preferred manner, said wires being indicated for convenience in Fig. 1 as two in number, 2, 3, and insulated simply by air gaps. Coöperating with the winding of the coil is a movable electrode or contact 4 leading from a suitable binding post or terminal 5. The windings 2, 3, are shown as beginning at opposite sides of the coil at 6, 7, and hence said wires are of different lengths from said points 6, 7, to any given point engaged by the contact 4, as the contact 4 will contact with the wire 2 a half turn farther along than would the wire 3 at any given point. The two wires are joined together at 8, where wire 9 connects therefrom to a binding post or terminal 10 of the circuit.

Referring to the diagrammatic view, Fig. 2, where I have shown my invention in all of its preferred details, it will be seen that I have provided a larger number of windings, six being shown, viz., windings 2, 3, 11, 12, 13 and 14, and these do not all continue the whole length of the coil. The coil is indicated as having its full complement of six wires for a part of its turns, four wires for more of its turns, and only two wires for all of its turns, it being understood that this arrangement is given merely for the purpose of illustrating my invention and that my invention is in no wise restricted to the number of wires or their relative lengths. For many purposes a simple winding such as is shown in Fig. 1 is sufficient, and in any event the number of wires and their relative lengths and the other constructional details herein explained, vary according to the requirements of any particular work or situation. By having a large number of turns as shown in Fig. 2, the result is that when the contact 4 is moved from left to right, Fig. 2, the inductance is cut into circuit very slowly or gradually, and as this is especially desirable when first introducing the inductance into the circuit, the greater number of wires is contained at the left-hand end of the coil, said number gradually decreasing toward the other end. It will be obvious that the greater the number of wires the less will be the jump or increase of inductance from winding to winding and hence the greater the advantage for fine work. By providing an extra length of wire from the end of the coil to the point 8 as shown in Fig. 2, instead of joining the windings together directly at the coil as in Fig. 1, I further increase the delicacy and efficiency of the apparatus.

The operation of an apparatus wound according to my invention is obvious and has already been explained. Briefly stated, when the sliding contact 4 moves in usual manner across the coil transversely of the turns thereof, it comes into successive contact, not with successive turns of the same wire as heretofore, but with adjacent turns of separate wires. The result is that the contact cannot short-circuit any individual turn and yet it maintains the circuit unbroken at all times. This is because it contacts alternately, Fig. 1, with the wire 2 and the wire 3. In the old form of winding, in which the successive turns would all be formed in one and the same wire, the contact would necessarily, in bridging from one turn to the next, cut out or short-circuit said turn, or else if it jumped from one turn to the next without maintaining contact with both at any one time, the circuit would be entirely broken at said instant when the contact jumped. Also by having the plurality of windings start from different peripheral points, i. e., by having the effective portions of the windings of different lengths with relation to the point of contact, I secure the gradual or subdivided introduction of the inductance above explained, which is of great advantage in fine work, and by having the extra length of inductance wire beyond the point of winding, i. e., between the end of the coil and the point 8 as shown in Fig. 2, I secure still greater delicacy of inductive effects in the practical operation of the coil.

As will be evident from the appended claims, I consider my invention as broadly new and therefore desire it understood that the constructional details thereof may be widely varied without departing from the spirit and scope of my invention.

Having described my invention, what I claim as new, and desire to secure by Letters Patent, is:

1. In a variable inductance winding, a plurality of inductance wires wound in parallel side by side, and a contact movable transversely of the turns of said winding into circuit-closing relation with adjacent turns of said wires successively, the arrangement being such that no two turns of the same wire shall at any time be bridged by said contact.

2. In a variable inductance winding, a plurality of inductance wires wound in parallel side by side, and a contact movable transversely of the turns of said winding into circuit-closing relation with adjacent turns of said wires successively, said wires having different effective lengths with relation to said contact.

3. In a variable inductance winding, a plurality of inductance wires wound in parallel side by side, and a contact movable transversely of the turns of said winding into circuit-closing relation with adjacent turns of said wires successively, said wires decreasing in number from one end of the winding to the other.

4. In a variable inductance winding, a plurality of inductance wires wound in parallel side by side, and a contact movable transversely of the turns of said winding into circuit-closing relation with adjacent turns of said wires successively, said wires having different effective lengths with relation to said contact and decreasing in number from one end of the winding to the other.

5. In a variable inductance winding, a plurality of inductance wires wound in parallel side by side, and a contact movable transversely of the turns of said winding into circuit-closing relation with adjacent turns of said wires successively, said wires having severally extensions between the winding and the adjacent circuit connection.

In testimony whereof, I have signed my name to this specification, in the presence of two subscribing witnesses.

MELVILLE EASTHAM.

Witnesses:
EDWARD MAXWELL,
GEO. H. MAXWELL.